United States Patent [19]

Owens

[11] 4,422,929

[45] Dec. 27, 1983

[54] WASTEWATER TREATMENT PLANT

[76] Inventor: Dewey E. Owens, P.O. Box 2443, Lafayette, La. 70502

[21] Appl. No.: 298,810

[22] Filed: Sep. 2, 1981

[51] Int. Cl.³ .............................................. B01D 23/24
[52] U.S. Cl. ..................................... 210/108; 210/117; 210/198.1; 210/275; 210/195.1; 210/202; 210/242.1
[58] Field of Search ................... 210/195.1, 275, 195.3, 210/320, 412, 670, 791, 792, 793, 153, 108, 136, 117, 198.1, 242.1, 202; 251/62, 63

[56] References Cited

U.S. PATENT DOCUMENTS

| | | | |
|---|---|---|---|
| 1,240,081 | 9/1917 | Moss | 210/536 |
| 3,749,246 | 7/1973 | Hargraves | 210/199 |
| 3,764,011 | 10/1973 | Owens | 210/192 |
| 3,792,773 | 2/1974 | Ross | 210/195.1 |
| 3,951,804 | 4/1976 | Smith | 210/195.1 |
| 3,994,803 | 11/1976 | Neff et al. | 210/275 |
| 4,052,300 | 10/1977 | Mosso | 210/275 |
| 4,075,101 | 2/1978 | Fuller et al. | 210/275 |
| 4,104,166 | 8/1978 | La Raus | 210/195.1 |
| 4,104,167 | 8/1978 | Besik | 210/195 |
| 4,191,652 | 3/1980 | Whitmore | 210/275 |
| 4,211,655 | 7/1980 | Jordan | 210/275 |
| 4,216,793 | 8/1980 | Volgstadt et al. | 251/63 |

Primary Examiner—Peter A. Hruskoci
Assistant Examiner—Wanda L. Millard
Attorney, Agent, or Firm—Emory L. Groff, Jr.

[57] ABSTRACT

A transportable self-contained sewage treatment plant includes an outer shell containing a plurality of adjacent chambers having pipes or lines providing a serial flow of fluid therebetween. An aeration chamber delivers biologically treated wastewater to a clarifier chamber which returns both heavy as well as lighter, floating particles to the aeration chamber while passing the remaining wastewater to a filter chamber for passage through a filter bed. The resultant treated fluid next passes into a backwash chamber before discharging as clean water from the plant. The filter bed in the filter chamber is periodically backflushed by applying a pressure head upon the clean water in the backwash chamber to direct the water in a counterflow manner through the filter bed while at the same time this pressure head closes check valves both to preclude discharge of clean water from the plant and to direct backflushed water to by-pass the clarifier chamber and enter the aeration chamber.

6 Claims, 8 Drawing Figures

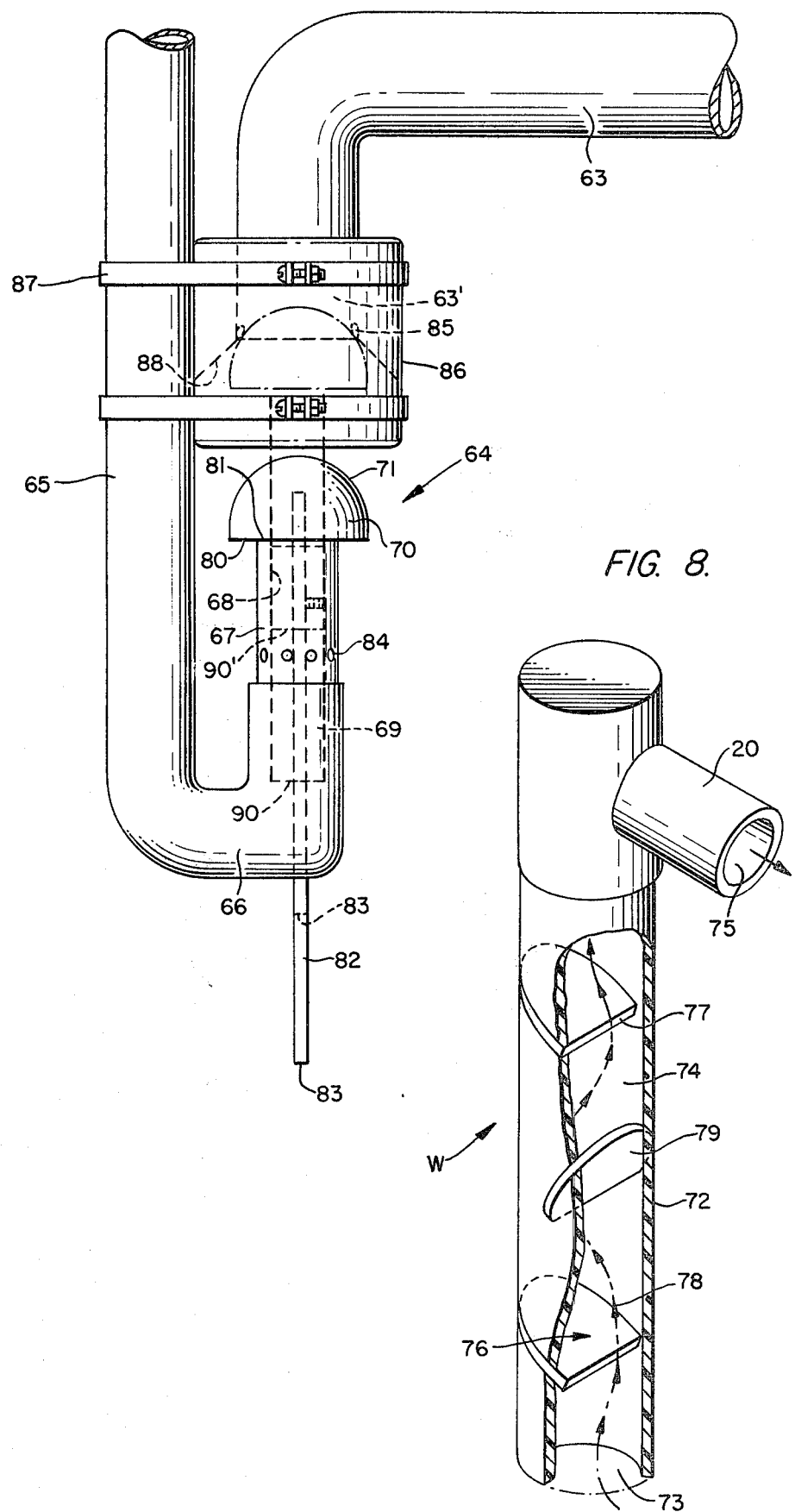

WASTEWATER TREATMENT PLANT

This invention relates generally to a sewage treatment apparatus and more particularly, to an improved self-contained wastewater treatment plant comprising a plurality of adjacent chambers contained within a conveniently transportable, unitary tank or shell.

The instant plant readily lends itself to solving the problem of providing adequate treatment means for handling the sewage product of relatively small groups of persons, either on a temporary or permanent basis. Thus, by employing the apparatus of the present invention, it will be appreciated that the sewage treatment needs of as few as a half dozen persons to as many as over a 100 persons may be efficiently achieved by means of a single tanke apparatus requiring no outside logistical support other than a source of electicity and compressed air. Quite obviously, in an extremely isolated installation, these latter requirements may be met by incorporating a generator and air compressor within the machine housing associated with the present treatment plant.

A significant demand exists for self-contained wastewater treatment plants according to the present invention and which are extremely compact and readily transportable. Offshore oil drilling rigs comprise but one example where a compact self-contained treatment plant is a necessity and in addition to improved efficiency of the present construction, there is obtained an extremely compact tank which may easily be installed upon such a rig and just as easily subsequently removed therefrom upon shutting down of the rig's operation.

The present assembly offers an improvement over the sewage treatment apparatus as disclosed in my earlier U.S. Pat. No. 3,764,011 dated Oct. 9, 1973 and which employs a greater number of individual chambers which not only biologically breaks down and destroys solid waste material as a result of bacterial action but also includes a subsequent treatment zone, following a clarifier zone, wherein the fluid is mechanically treated by passing same upwardly through a filter bed. The chamber containing the filter bed is sealed, as is also a subsequent chamber which receives clean water from the filter chamber such that an automatic flushing of the filter bed is achieved upon the application of a pressure head upon the clean water. This causes a backflush of the clean water in a counterflow direction through the filter bed while a plurality of check valves preclude the clean water from discharging from the treatment plant during the backflush operation and also from discharging into the wastewater contained in the treatment tank next preceeding the filter chamber. A continuous gravity flow of fluid serially conveys the wastewater through all of the individual chambers from the plant inlet to its outlet, while air lift pumps are included to provide recirculation of solid waste matter from certain of the chambers to an aeration chamber.

Accordingly, one of the objects of the present invention is to provide an improved wastewater treatment plant including a single tank containing a plurality of serially connected chambers including an aeration chamber, clarifier chamber and filter chamber.

Another object of the present invention is to provide an improved wastewater treatment plant having a plurality of serially connected chambers including clarifier, filter and backwash chambers with means operative to backflush clean water from the backwash chamber through the filter medium in the filter chamber.

Still another object of the present invention is to provide an improved wastewater treatment plant including a plurality of chambers within a single tank including sealed filter and backwash chambers with valve means associated with the discharge fitting from the backwash chamber such that upon application of the pressure head therein clean fluid from the backwash chamber is flushed back into the filter chamber in a counterflow manner through the filter bed thereof.

With these and other objects in view which will more readily appear as the nature of the invention is better understood, the invention consists in the novel construction, combination and arrangement of parts hereinafter more fully described, illustrated and claimed.

FIG. 7 is an enlarged view of the fluid-actuated backwash valve in the chamber of FIG. 6; and FIG. 8 is an enlarged perspective view of the weir in the aeration chamber of FIG. 1.

Similar reference characters designate corresponding parts throughout the several figures of the drawings.

Figure 1:
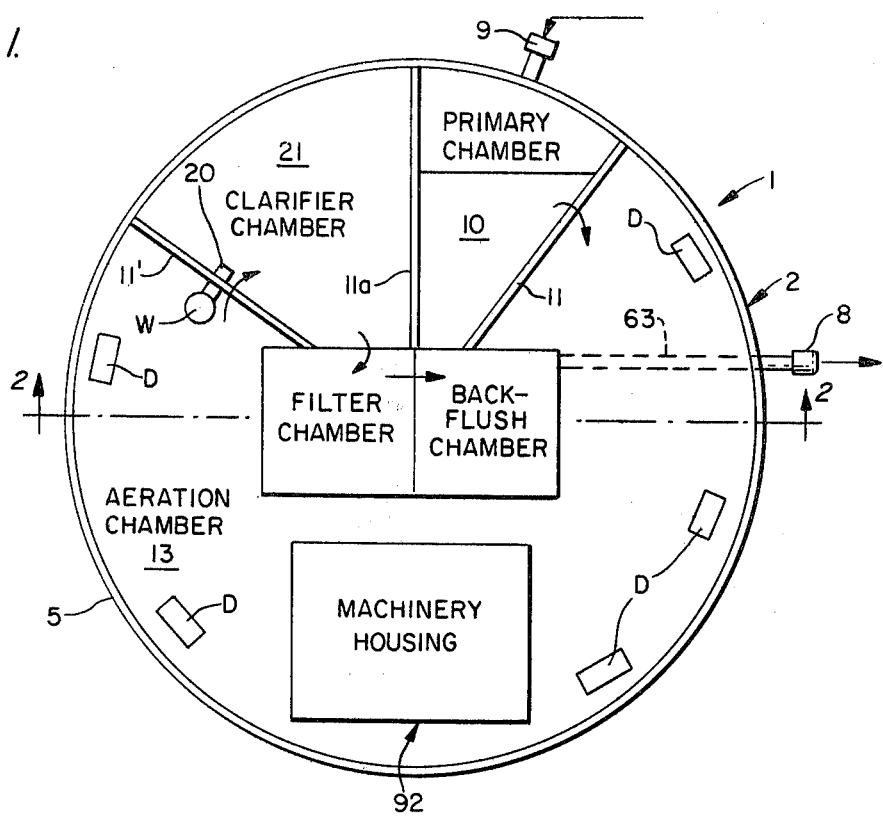
FIG. 1 is a diagrammatic top plan view of a wastewater treatment plant according to the present invention.

Referring now to the drawings, particularly FIG. 1, the present invention will be understood to comprise a wastewater treatment plant generally designated 1, including a single unit or self-contained assembly disposed within the confines of a peripheral shell or tank 2 having a top wall 3 and bottom wall 4 bounded by the side wall 5. The tank 2 is preferably configured to provide a flat top wall 3 and bottom wall 4 and a substantially cylindrical side wall 5, an arrangement, when considering the internal construction of the tank 2, that readily lends itself to a treatment plant 1 having the utmost compactness, thereby providing an extremely easily transported plant. In this regard, any suitable attachment devices such as the lift lugs 6 may be provided upon the top wall 3 to accommodate hoist cables and additionally, appropriate cleats or spacers 7 may be provided on the bottom wall 4 to enable the introduction of fork lift tines beneath the tank 2 when disposed upon a supporting surface.

The construction of the tank as well as the walls or partitions defining the plurality of chambers therein may be of any suitable metal or synthetic composition. The drawings have been lined to reflect a plastic construction as the present development readily lends itself to the use of this material which obviously has certain advantages including ease of fabrication, high strength-to-weight ratio and lack of corrosion when exposed to solid and liquid materials. Additionally, it will be appreciated that the novel system as disclosed herein may alternatively be housed within a tank of polygonal configuration.

Figure 3:
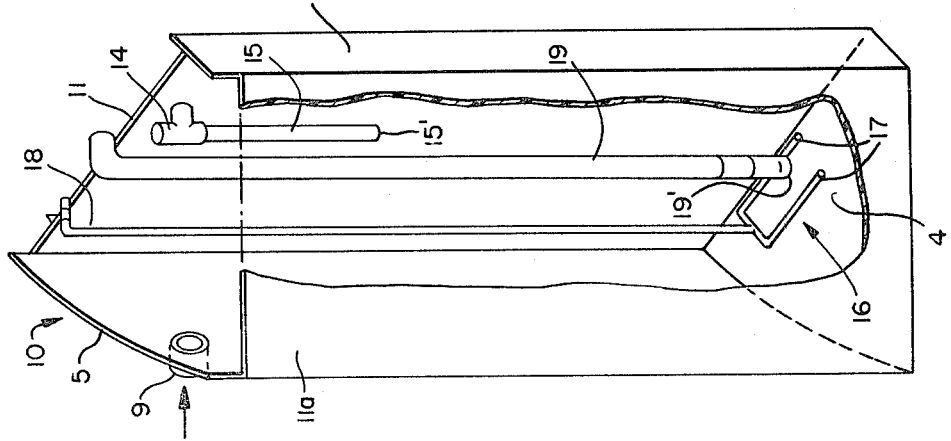
FIG. 3 is a fragmentary perspective view of the primary chamber of FIG. 1.

As mentioned, the interior of the tank 2 is divided into a plurality of individual, separate chambers or treatment areas with the incoming raw sewage being serially conveyed through all of the chambers by gravity flow, with clean water issuing from the outlet 8. The incoming sewage is admitted to the plant 1 through an inlet 9 disposed through the upper portion of the tank side wall 5 and which communicates with the interior of a primary chamber 10 as shown most clearly in FIGS. 1 and 3. This primary chamber 10 is substantially pie-shaped in horizontal cross-section and is defined by a curved segment of the tank side wall 5 and a pair of radially extending lateral walls 11, 11a having their terminal portions joined to a common inner wall. The chamber 10 serves as a grease trap to stratify those fluids and solids lighter than and heavier than the specific gravity of the bulk of the wastewater entering therein.

Fluid flow conveying means is provided to transfer wastewater from the confines of the primary chamber 10 to a next adjacent, aeration chamber 13. This conveying means includes a fitting 14 disposed through one lateral wall 11 at a point slightly below the plane of the inlet fitting 9 and is provided with a downwardly extending transfer line 15 the bottom of which is disposed at a point substantially below the plane of the inlet 9. In this manner, a gravity flow is assured as wastewater enters the chamber 10 through the inlet 9 and rises through the transfer line 15 to the level of the fitting 14 and thence flows into the confines of the adjacent aeration chamber 13. Locating the bottom 15' of the transfer line 15 at a point well below the inlet 9 or wastewater level and at the same time substantially above the lower reaches of the chamber, accomplishes two purposes. It prevents grease and other lighter-than-water compositions from entering the subsequent treatment zone and it precludes blocking of the line 15 and fitting 14 by heavy solids which would interfere with the gravity flow system.

Disposed upon the bottom 4 of the primary chamber 10 is an aerator 16 including one or more air tubes 17 supplied by an upwardly extending air line 18 which is operated to initiate the aerobic action upon the sewage and to prevent the solids from settling and becoming packed in the bottom of this chamber. A sludge air pump 19 also extends to the lower reaches of the primary chamber 10 and is operated to pump sludge from the lower portion of this chamber into the adjacent aeration chamber 13. Any suitable well-known air line structure (not shown) may be used to actuate the pump 19, the bottom inlet 19' of which is located near the bottom wall 4 and preferably intermediate a pair of aerator tubes 17.

The aeration chamber 13 receiving the wastewater from primary chamber 10 will be seen from FIG. 1 to occupy the majority of the volume of the tank 2 since it is within this area that the wastewater must remain for a minimum of 24 hours in order to obtain the desired degree of treatment of the total expected daily flow of wastewater through the plant. The wastewater within the aeration chamber 13 is mixed with a metabolizing, flocculated, continuously circulating biological mass, referred to as mixed liquor suspended solids (MLSS). The particles of this biological mass, in the presence of oxygen and a suitable enironment, rapidly absorb and flocculate the soluble collodial and suspended organics which are subsequently oxidized or utilized in the synthesis of new cells, thereby allowing further absorption of organic material from the wastewater solution. Accordingly, appropriate means are employed to maintain a continuous aeration of the wastewater within the aeration chamber to achieve the desired degree of oxidation and dispersion of the solid particles therein and to promote the growth and propagation of bacteria. This aeration means includes a plurality of submerged air diffuser heads D within the chamber such as utilized in the earlier referenced patent and since the structure thereof is well known these devices D are diagrammatically illustrated in FIG. 1.

The desired degree of treatment of the wastewater in the aeration chamber 13 is accomplished after a minimum period of 24 hours following which sewage from the fluid flow conveying member 14 and the lift pump 19 enters the aeration chamber and displaces an equal volume of the treated fluid therein. This fluid displacement is accomplished through a weir W disposed within the aeration chamber 13 and which communicates with a fitting 20 serving as fluid flow conveying means passing through a lateral wall 11' and into an adjacent clarifier chamber 21.

As shown in FIG. 1, the weir W is located at an end or area of the aeration chamber that is far removed from that area receiving the raw sewage from the fitting 14 and pump 19 associated with the primary chamber 10.

The details of the aeration chamber weir W are shown most clearly in FIG. 8 wherein this weir will be seen to comprise a vertical pipe 72 having a bottom opening 73 leading to an interior passageway 74 which in turn communicates with the interior 75 of the fitting 20 passing through the lateral wall 11' into the adjacent clarifier chamber 21. The vertical passageway 74 of the weir is modified in order to influence the normally turbulent and particle-laden condition of the fluid passing therethrough. This modification includes the provision of a plurality of angularly disposed baffle plates 76 within the pipe passageway 74, each having a free edge 77 spaced from the interior wall of the pipe to present a restricted or circuitous flow of fluid therepast. The baffles 76 are preferably inclined approximately 45° and as will be seen in FIG. 8, each is oppositely inclined with respect to each adjacent baffle. Additionally, it will be understood that each baffle free edge 77 extends at least to the center axis of the pipe passageway 74 such that a sinuous fluid flow path 78 is produced therethrough. With this construction, not only is the turbulence of fluid passing through the weir reduced, but also the sinuous flow path, coupled with the downwardly inclined baffle edges 77, causes many of the moving particles to impinge upon the undersurfaces 79 of the baffles and to fall back into the aeration chamber. In the case of a plastic pipe 72 as shown in FIG. 8, the baffles 76 may most conveniently be installed by initially slotting the pipe to the correct angular depth and thereafter press-fitting the pre-cut baffles into the slots.

Figure 2:
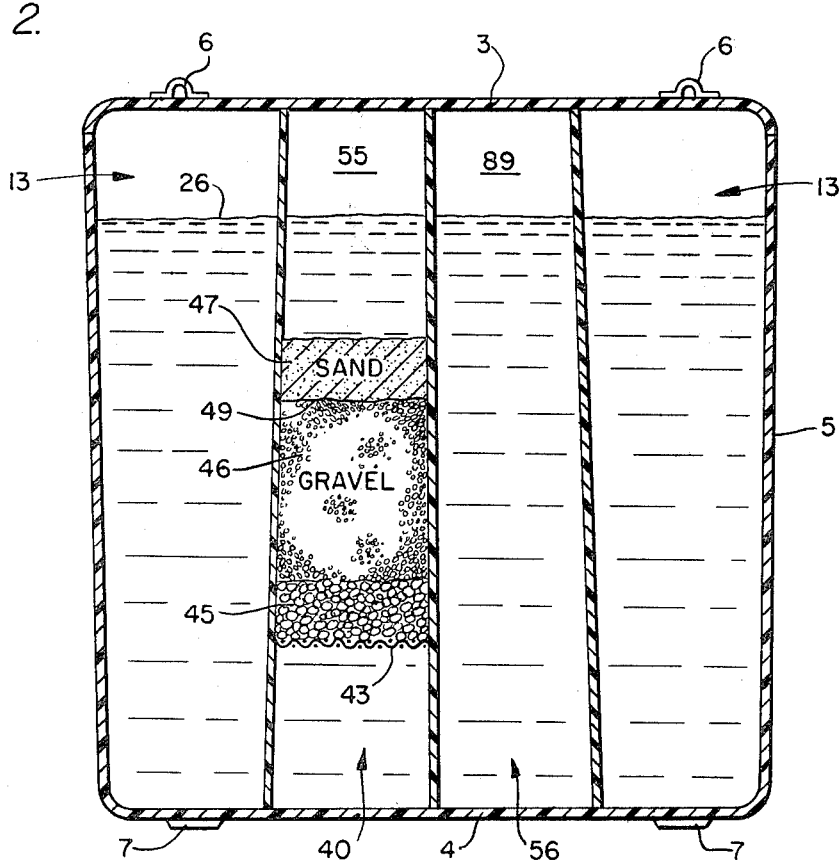
FIG. 2 is a vertical sectional view taken along the line 2—2 of FIG. 1.
Figure 4:
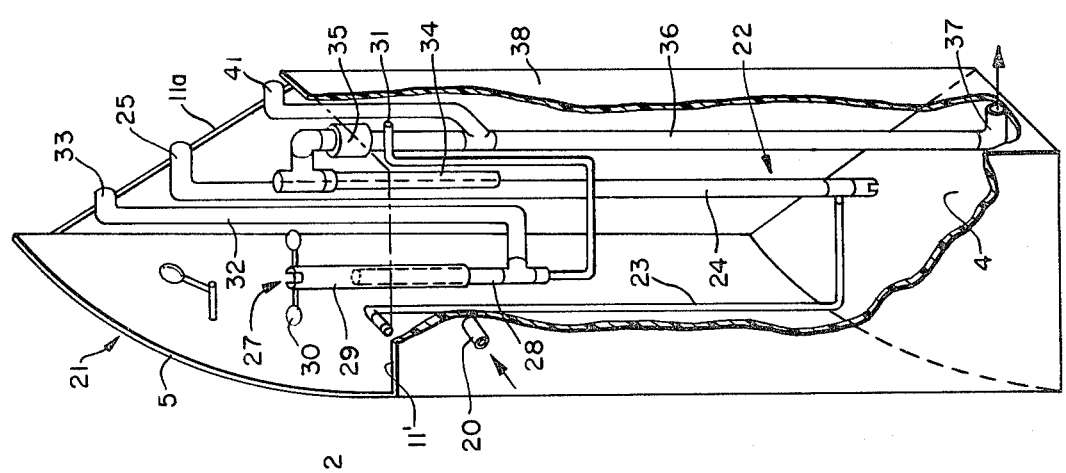
FIG. 4 is a fragmentary perspective view of the clarifier chamber of FIG. 1.

The details of the construction of the clarifier chamber 21 are shown most clearly in FIG. 4 of the drawings wherein it will be seen that this chamber is substantially pie-shaped as is the primary chamber 10 and in fact shares a common lateral wall 11a therewith. Alternatively, each of the plurality of chambers of the plant 1 may be designed with its own plurality of lateral walls however, for the purpose of ease of manufacturing as well as economy, especially when the plant is constructed of a synthetic resin composition, a single common wall may serve as the barrier between any of the plurality of adjacent chambers. The inclined or tapered configuration of the chamber walls as viewed in FIG. 2 reflects a preferred construction when the chambers are formed in a mold and which facilitates their removal from the mold.

The fluid received in the clarifier chamber 21 from the adjacent aeration chamber 13 will be understood to contain MLSS from the previous chamber and before discharging a treated effluent from the chamber 21, these solids must be separated from the liquid. Accordingly, the clarifier chamber provides a quiescent environment wherein these solids are removed by the force of gravity and when accumulated upon the bottom 4 of the chamber 21, an air lift pump 22 removes same and returns them to the aeration chamber 13. This air lift pump 22 includes an air supply line 23 connected adjacent the lower portion of a lift pipe 24 having a return line 25 extending above the plane or top level 26 of the wastewater contained within the plurality of chambers of the treatment plant 1.

With the pump 22 removing those heavier particles forming a sludge at the bottom of the chamber 21, it will be appreciated that means must be provided to collect and remove those lighter weight particles which will be floating adjacent the top surface 26 of the fluid within the chamber. This latter procedure is accomplished by means of a floating skimmer 27 operating upon the general principle as disclosed by the skimmer in the aforementioned U.S. Pat. No. 3,764,011. The skimmer 27 will be seen to include a fixed vertical tube 28 about which is slidably disposed, in a telescopic manner, a movable tube 29. The upper portion of this latter tube 29 is slotted or otherwise provided with apertures and includes floats 30. An air control line 31 leads to the juncture between the bottom of the fixed vertical tube 28 and a skimmer riser pipe 23 such that upon application of compressed air to the lower portion of the riser pipe 32, it will be appreciated that a negative pressure is generated within the vertical tube 28 and movable tube 29 to draw in water from the upper portion of the movable tube 29, which upper portion is constantly maintained at the proper vertical position by means of the floats 30 so that the skimmer 27 breaks the surface tension and collects all of the floating solid particles which are then directed upwardly through the skimmer riser pipe 32 and through an uppermost return line 33 leading to the aeration chamber and in a plane above the fluid level 26.

The fluid volume of the clarifier chamber 21 is constructed so as to provide a minimum detention time of 4 hours before incoming wastewater from the aeration chamber displaces the treated water into the next serially connected chamber. As previously mentioned, the minumum detention time within the aeration chamber 13 should be 24 hours and accordingly, it will be seen that a ratio of 1:6 exists between the clarifier and aeration chambers and this proportion will be obvious from a review of the arrangement shown in FIG. 1 of the drawings.

The substantially clear and clean fluid within the upper portion of the clarifier chamber 21 is drawn off through a weir 34 and a normally opened check valve 35 and thence downwardly through fluid flow conveying means comprising a clarifier chamber discharge line 36 which extends to the lower portion of the chamber wherein it is connected to a coupling 37 projecting through the clarifier chamber inner wall 38 and an adjacent lateral wall 39 of the juxtaposed filter chamber 40. Again, the two juxtaposed walls 38 and 39 may alternatively comprise a single common wall. The clarifier chamber discharge line 36 is provided with an upwardly extending backflush by-pass line 41, the bottom of which communicates with the discharge line 36 below the check valve 35 while the upper portion thereof communicates with the aeration chamber 13. The function of the check valve 35 and by-pass line 41 will be described hereinafter.

The fluid being directed into the filter chamber 40 from the clarifier chamber 21 enters a bottom compartment 42 defined between the chamber's bottom wall 4 and a perforated support member 43 which may comprise a screen or similar member designed to support a filter bed, generally designated 44. From FIGS. 2 and 4, this filter bed will be seen to include a plurality of layers of various sizes of particles with the lowest-most area of this aggregate consisting of gravel. In this connection, it will be appreciated that the bottom section directly disposed atop the support screen 43 includes course gravel 45 which in turn supports one or more layers of progressively smaller gravel material 46. The upper-most level or portion of the filter bed 44 includes a mass of very fine material such as sand 47 which is confined within a peripheral container 48 having a suitable porous support member 49 across the bottom thereof.

Extending transversely through the mass of the lower area of the filter bed 44 are one or more agitator members 50 comprising elongated elements such as PVC pipes horizontally extending the full width or depth of the filter chamber 40 and provided with a plurality of peripheral slots 51 of a minimal width to preclude the introduction of the filter bed material therethrough. One end of each member 50 is capped as at 51' while the opposite end 52 communicates with a fluid agitator pipe extending upwardly through the treatment plant top wall 3 wherein its distal portion is provided with a removable cap 54. By this arrangement, it will be understood that after a period of use of the treatment plant, wherein the filter bed 44 has become tightly packed as a result of shifting of the particles of the various layers of filter material therein due to a substantial upward flow of fluid therethrough, this packed condition may be readily relieved by use of the agitator pipe and its member 50. This is achieved merely be removing the cap 54 and attaching a water hose thereto whereupon a pressure flow of water downwardly through the agitator pipe 53 and outwardly through the plurality of slots 51 will agitate the filter bed material and loosen it up to preclude unwanted obstruction of wastewater flow through the filter bed.

Upon normal operation of the plant 1, the watewater entering the lower filter chamber compartment 42 continues to rise and fill the chamber 40 from the bottom upwardly to the fluid level 26, passing through the various layers of the filter bed 44 which entrap the remaining particles of waste therein such that when this fluid reaches the upper compartment 55 above the filter bed, it appears as a clean fluid. The liquid disposed within this upper compartment 55, above the level of the top-most sand 47, is conveyed by a gravity flow to an adjacent backwash chamber 56.

Figure 5:
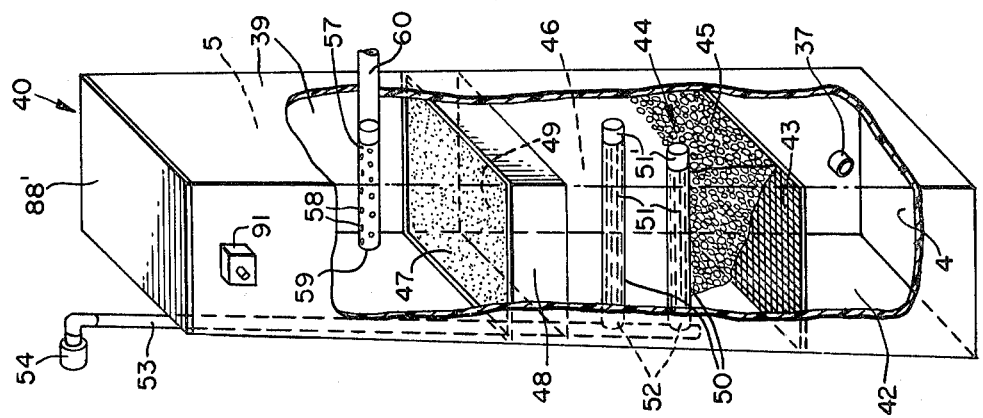
FIG. 5 is a fragmentary perspective view of the filter chamber of FIG. 1.

This conveyance is achieved by fluid flow conveying means comprising a filter chamber collection/discharge member 57 which will be seen from FIG. 5 of the drawings to comprise a pipe provided with a plurality of peripheral perforations 58 and which is capped at one end as at 59 while the opposite end is provided with an outlet coupling 60 communicating through one lateral wall 39 of the filter chamber and through a juxtaposed lateral wall 39 of the adjacent backwash chamber 56.

Figure 6:
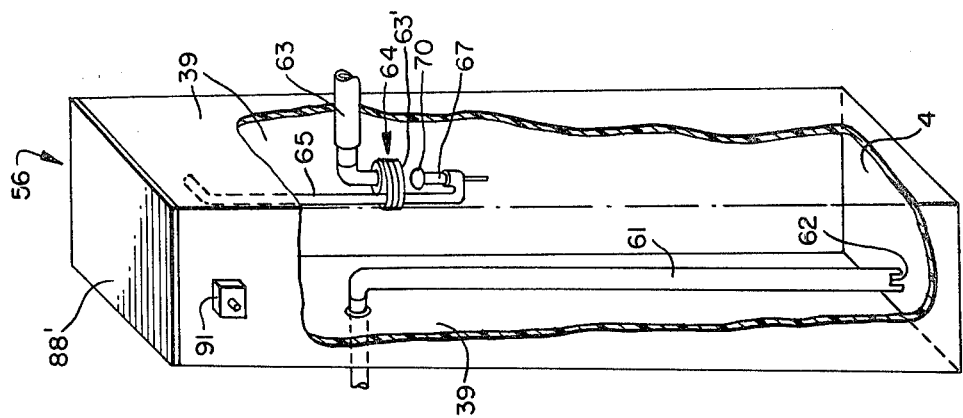
FIG. 6 is a fragmentary perspective view of the backwash chamber of FIG. 1.

This coupling in turn communicates with a backwash chamber conduit 61 disposed within the chamber 56 and extending to a bottom discharge 62 disposed adjacent the bottom wall 4 of the backwash chamber. The clean water entering the backwash chamber 56 fills the interior thereof to a point which is level with a backwash chamber discharge coupling 63, which coupling serves as fluid flow conveying means extending through one lateral wall 39 of the chamber and which is joined to the treatment plant outlet 8. The coupling is provided with a downwardly extending inlet 63' terminating below the plant fluid level 26. The plane of the discharge coupling 63 quite obviously is disposed no higher than the plane of the incoming coupling 60 supplying the backwash chamber and as will be seen in FIG. 6 of the drawings, the discharge coupling inlet 63' cooperates with an in-line check valve 64 which is normally opened to allow the unimpeded flow of the clean water from the interior of the backwash chamber outwardly to the plant outlet 8 communicating with the discharge coupling.

The details of the check valve 64 are shown most clearly in FIG. 7 of the drawings which depicts the valve structure in full lines as it appears when in the normal opened condition. The valve is operated by means of compressed air supplied from a suitable source to the compressed air pipe 65 which includes a lowermost J-bend 66 terminating in an upperwardly directed end portion 67, which end portion will be seen to be axially aligned with and spaced below the inlet 63' of the discharge coupling 63. The pipe end portion 67 is provided with an internal bore 68 within which is slidably disposed a valve plug 69. This plug 69 serves to support and guide an enlarged valve head 70 suitably affixed to the upper portion of the plug 69 and which is provided with a rounded or hemispherical surface 71. In the illustrated at-rest position as shown in FIG. 7, the undersurface 80 of the valve head 70 abuts and projects beyond the top surface 81 of the pipe end portion 67. A valve guide rod 82, axially disposed within the plug 69, extends beyond the bottom of the valve plug, through the J-bend 66 and includes a distal portion 83 disposed outside the J-bend. The periphery of the end portion 67 will be seen to include a plurality of radially extending air holes 84 spaced well below the top surface 81 and communicating with the internal bore 68. The function of these holes will become apparent hereinafter when the operation of the check valve 64 is described in detail.

The shiftable valve head 70 is intended to cooperate with the discharge coupling opening or inlet 63' to affect a fluid tight closure thereof when the valve head 70 is vertically displaced to the broken line position of FIG. 7. Accordingly, the periphery of the inlet opening 63' is provided with appropriate sealing means such as the "O" ring or seat 85 adapted to seal with the rounded surface 71 of the valve head. To insure maintenance of a fixed alignment between the stationary discharge coupling inlet 63' and the displaceable valve head 70, the air pipe 65 and discharge coupling 63 may be securely affixed with respect to one another by appropriate means such as the valve mount 86 which will be seen to surround the inlet portion 63' of the discharge coupling and in turn is securely attached with respect to the air pipe 65 by means of suitable clamp means 87. Quite obviously the lower portion of the interior of the valve mount 86 is provided with a valve head bore 88 of sufficient dimension to accommodate the vertically displaceable valve head 70.

The function of the aforedescribed backwash chamber check valve 64 as well as the clarifier chamber check valve 35 will now be described. Periodically, for example once a week, the filter bed 44 of the filter chamber 40 may be revitalized by subjecting it to a fluid shock and fluid flow in a direction counter to the normal upward fluid flow therethrough as occurs during the usual functioning of the treatment plant. The filter chamber 40 and backwash chamber 56 will be understood to comprise sealed units. In this respect, these two chambers may alternatively be provided with a separate top 88' which may be removably attached by any suitable fastening means (not shown) in order to allow maintenance of the components therein. With this sealed construction, it will follow that the only communication between the exterior of these two chambers and the interior thereof will comprise the above described fluid flow conveying means or couplings.

Thus, to effect a back-flushing of the clean fluid contained within the backwash chamber 56, it is proposed to apply a pressure head atop the liquid level 26 therein within the space 89 in the upper portion of the backwash chamber. This is achieved by introducing compressed air through the air line 65 entering through one wall 39 of the backwash chamber whereupon the pressurized air acts upon the lower portion 90 of the valve plug 69 to drive the plug and its attached head 70 upwardly to the closed position reflected by broken lines in FIG. 7. As long as the air pressure acts upon the valve plug bottom 90, the valve head 70 will remain sealed by the seat 85 thereby sealing off and preventing any discharge of fluid within the chamber 56 through the coupling 63 communicating with the plant outlet 8. With the valve 64 now closed, it will be seen that the plug bottom is located at an elevation 90' that is above the level of the air holes 84 thereby allowing an amount of compressed air to issue there from llland through the holes 84. This air bubbles upwardly through the clean fluid within the backwash chamber and forms a pressure head within the space 89 atop the fluid level 26 therein. This pressure head, as it builds up, thereafter forces the clean fluid within the backwash chamber 56 through the only opened fluid communicating means associated with the chamber, namely the conduit 61 which conveys the clean fluid in a reverse flow through the coupling 60 and into the upper compartment 55 of the adjacent filter chamber 40. As the pressure continues, fluid will then fill the upper compartment 55 of the filter chamber 40 and will be forced downwardly or counter to the normal treatment flow of the fluid and through the entire filter bed 44 into the bottom compartment. This counter flow will be understood to unclog the layers of the filter bed 44 by picking up particles entrained therein and delivering them into the bottom compartment 42 of the filter chamber. From this point, the particle-ladened fluid continues to be forced through the only fluid flow conveying means available, namely the coupling 37 which directs this fluid into the clarifier chamber discharge line 36 and as this fluid is forced upwardly therein, the pressure closes the check valve 35 such that all reversely flowing fluid then is directed through the backflush by-pass line 41 which conveys the fluid into the aeration chamber 13 wherein it subsequently will be recycled through the various serially connected chambers when the treatment plant is returned to its normal processing cycle.

The complete back-flush cycle usually will take only two minutes after which the supply of air pressure being delivered through the line 65 to the backwash chamber 56 is turned off. Thereafter, air trapped within the two sealed chambers 40 and 56 is bled off by means of solenoid valves 91 associated with the upper portion of each of the two sealed chambers. When this pressure is relieved the two check valves 35 and 64 will return to their normal open position and fluid from the clarifier chamber will automatically flow by gravity to refill the filter chamber 40, backwash chamber 56 and then discharge from the plant outlet 8.

The mechanisms necessary to regulate the operation of the various components of the plant 1 are conveniently situated in an appropriate machinery housing 92 which may be located upon the tank top wall 3 as shown in FIG. 1 of the drawings. The items contained in the housing 92 are well known control devices such as timers, relays and valves for regulating the various air lines.

In a normal installation, the effluent issuing from the plant outlet 8 gravity will flow into a well drained ditch in the case of a land installation or otherwise into the sea in the case of an offshore installation. If, on the other hand, any particular installation precludes a gravity run-off then quite obviously a suitable collection chamber may be associated with the plant shell 2 and would include an appropriate lift pump to carry away the effluent when the chamber is filled to a predetermined level.

I claim:

1. A wastewater treatment plant including, a plurality of separate adjacent chambers, one said chamber comprising an aeration chamber adapted to receive wastewater, other ones of said chambers comprising clarifier, filter and backwash chambers, said filter and backwash chambers each comprising air-tight sealed chambers, fluid flow conveying means connecting adjacent ones of said chambers to provide communication of fluid serially from said aeration chamber to said clarifier chamber to said filter chamber to said backwash chamber and then to discharge clean fluid from said backwash chamber, means in said aeration chamber biologically attacking and breaking down organic matter in said wastewater therein, means in said clarifier chamber collecting heavier solid waste matter from adjacent the lower reaches thereof and returning said matter to said aeration chamber, means in said clarifier chamber collecting lighter floating solid waste particles from adjacent the surface of said wastewater therein and returning said particles to said aeration chamber, said collecting means including a floating skimmer, a filter bed in said filter chamber disposed intermediate said fluid conveying means therein communicating wastewater from said clarifier chamber to said filter chamber and that said conveying means discharging fluid from said filter chamber to said backwash chamber, said fluid flow conveying means from said clarifier chamber to said filter chamber including a weir within said clarifier chamber, said filter chamber including an upper and bottom compartment, said filter bed disposed intermediate said two compartments, said fluid flow conveying means from said filter chamber to said backwash chamber disposed within said upper compartment, said fluid flow conveying means between said clarifier chamber and filter chamber including a coupling communicating with said filter chamber bottom compartment to normally direct incoming fluid upwardly through said filter bed to said upper compartment, means in said backwash chamber operable to exert a forced backflush of clean fluid from said backwash chamber and serially into said filter chamber upper compartment thence, downwardly through said filter bed and thence through said coupling, said fluid flow conveying means discharging clean fluid from said backwash chamber including a discharge coupling, said operable means to exert a forced backflush including an air pressure line in said sealed backwash chamber, a normally opened check valve between said air pressure line and said discharge coupling operable by air from said air pressure line to close said check valve to seal said discharge coupling, said air pressure line including an end portion having an internal bore, a valve head having a plug slidably fitted within said bore, said air pressure line provided with air holes whereby, air pressure upon said plug displaces said plug to expose said air holes and admit air into an backwash chamber concurrently with said closing of said check valve and forced backflush, agitator means disposed within said filter bed, a pipe joined to said agitator means and adapted to supply fluid from an external source to said agitator means to loosen said filter bed, a by-pass line in said clarifier chamber receiving said backflush fluid from said filter chamber and directing it into said aeration chamber without disturbing wastewater within said clarifier chamber, said fluid flow conveying means between said clarifier chamber and said filter chamber including a substantially vertical discharge line having a lowermost portion joined to said clarifier chamber coupling, a normally opened check valve in said discharge line and adjacent said weir, and said by-pass line communicating with said discharge line intermediate said check valve and clarifier chamber coupling.

2. A wastewater treatment plant according to claim 1 including, an outer tank containing said plurality of chambers and said tank provided with a side wall defining a plant having a substantially circular configuration in plan.

3. A wastewater treatment plant according to claim 1 including, an outer tank containing said plurality of chambers, said chambers having substantially vertically disposed walls and said tank and chamber walls constructed of a non-metallic composition.

4. A wastewater treatment plant according to claim 1 wherein, one of said chambers includes a primary chamber having inlet means for receiving wastewater into said plant, and fluid flow conveying means between said primary chamber and aeration chamber comprising a transfer line having a bottom inlet disposed intermediate the height of said primary chamber.

5. A wastewater treatment plant according to claim 1 wherein, said fluid flow conveying means between said aeration and clarifier chambers comprise a weir disposed within said aeration chamber, said weir including a substantially vertical pipe, and means in said vertical pipe defining a circuitous flow path of fluid passing therethrough.

6. A wastewater treatment plant according to claim 5 wherein, said circuitous flow path means includes a plurality of angularly disposed baffle plates within said vertical pipe.

* * * * *